(12) United States Patent
Androulaki et al.

(10) Patent No.: US 10,235,374 B2
(45) Date of Patent: Mar. 19, 2019

(54) KEY-VALUE STORE FOR MANAGING USER FILES BASED ON PAIRS OF KEY-VALUE PAIRS

(71) Applicant: International Business Machines Corporation, Armonk, NY (US)

(72) Inventors: Elli Androulaki, Zurich (CH); Robert Basham, Aloha, OR (US); Nikola Knezevic, Zurich (CH); Martin Petermann, Zurich (CH); Harold J. Roberson, II, Rochester, MN (US); Wayne A. Sawdon, San Jose, CA (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 15/064,305

(22) Filed: Mar. 8, 2016

(65) Prior Publication Data
US 2017/0262461 A1  Sep. 14, 2017

(51) Int. Cl.
*G06F 17/30* (2006.01)

(52) U.S. Cl.
CPC .. *G06F 17/30106* (2013.01); *G06F 17/30094* (2013.01)

(58) Field of Classification Search
CPC .............. G06F 17/30106; G06F 17/30126
USPC ....... 707/731, 831, 747, 737, 652, 822, 706, 707/764, 756; 717/121
See application file for complete search history.

(56) References Cited

U.S. PATENT DOCUMENTS

| | | | | |
|---|---|---|---|---|
| 7,062,490 | B2* | 6/2006 | Adya | G06F 17/30094 |
| 7,831,581 | B1* | 11/2010 | Emigh | G06F 17/30707 |
| | | | | 707/706 |
| 8,510,350 | B2* | 8/2013 | Isaacson | G06F 17/30126 |
| | | | | 707/822 |
| 8,868,576 | B1 | 10/2014 | Faibish et al. | |
| 9,740,991 | B2* | 8/2017 | Seidman | G06Q 10/06 |
| 2007/0073770 | A1* | 3/2007 | Morris | G06F 17/30017 |
| 2012/0221571 | A1* | 8/2012 | Orman | G06F 17/3097 |
| | | | | 707/737 |
| 2012/0246190 | A1 | 9/2012 | Surtani et al. | |
| 2013/0103729 | A1* | 4/2013 | Cooney | G06F 17/30126 |
| | | | | 707/831 |
| 2013/0124545 | A1* | 5/2013 | Holmberg | G06F 17/30244 |
| | | | | 707/756 |
| 2014/0181039 | A1* | 6/2014 | Harrison | G06F 17/30091 |
| | | | | 707/652 |

(Continued)

*Primary Examiner* — Jeff A Burke
*Assistant Examiner* — Thong H Vu
(74) *Attorney, Agent, or Firm* — Scully, Scott, Murphy & Presser, P.C.; Daniel Morris, Esq.

(57) ABSTRACT

A key-value store for storing and retrieving user files based on key-value pairs, hereafter referred to as KVPs. For each user of the key-value store, each file of a set of files of said each user is stored as one or more pairs of KVPs. Each of said one or more pairs comprises a KVP of a first type and a KVP of a second type. The KVP of the first type comprises at least a part of contents of said each file, whereas the KVP of the second type comprises metadata (and possibly attributes) of said each file. Each KVP of the second type links to one or more KVPs of the first type. Further provided are related method and computer program products.

16 Claims, 5 Drawing Sheets

(56) References Cited

U.S. PATENT DOCUMENTS

2015/0356138 A1* 12/2015 Anderson ......... G06F 17/30445
　　　　　　　　　　　　　　　　　　　　　707/764
2016/0063021 A1*  3/2016 Morgan ............ G06F 17/30097
　　　　　　　　　　　　　　　　　　　　　707/747

* cited by examiner

KEY-VALUE STORE FOR MANAGING USER FILES BASED ON PAIRS OF KEY-VALUE PAIRS

BACKGROUND

The invention relates in general to the field of key-value stores and related methods for storing, retrieving and managing files based on key-value pairs.

A key-value store, also called key-value system, or key-value database, refers to a data storage system, wherein records are stored as objects called key-value pairs. Contents of the record (i.e., the value of a key-value pair) can be retrieved from the key-value store using a key (i.e., the name of that record) that uniquely identifies this record. More generally, key-value stores are typically equipped with computerized methods for managing objects stored thereon.

Whereas relational databases pre-define a data structure in the database (as tables containing fields with defined data types), key-value stores do not impose such constraints and therefore offer more flexibility, often require less memory to store the same contents, which can lead to large performance gains in certain conditions. However, the key-value structures of a generic key-value store make it difficult to represent filesystem data and metadata.

SUMMARY

According to a first aspect, the present invention is embodied as a key-value store for storing and retrieving user files based on key-value pairs, hereafter referred to as KVPs. For each user of the key-value store, each file of a set of files of the user is stored as one or more pairs of KVPs. Each pair of KVPs comprises a KVPs of different types. A KVP of a first type comprises at least a part of contents of said each file, whereas a KVP of a second type comprises metadata (and possibly attributes) of said each file. In the present scheme, each KVP of the second type links to one or more KVPs of the first type.

The key-value store may further comprise KVPs of other types. For instance, it may comprise, for each user, KVPs of a third type, so as to emulate respective directories of a filesystem of said each user. To that aim, a KVP of the third type links to one or more KVPs of the second type (i.e., capturing the file metadata), which, in turn, link to one or more KVPs of the first type (i.e., content-related).

KVPs of the third type (i.e., emulating directories of the user filesystem) may for instance link to additional (descendant) KVPs of the third type, to emulate child directories of the user filesystem.

In preferred embodiments, the key-value store is further configured to logically constrain the naming of KVPs of each type, to make sure that any new KVP put or created in the key-value store has a unique name (which corresponds to the key of the KVP). This can notably be achieved by way of counters and/or hashes included in the names of the KVPs.

In addition, any new KVP may be stored on the key-value store so as to shadow an older version thereof. Specific embodiments further provide solutions for suitably representing filesystem data and metadata over a generic key-value store interface, and managing such data.

In this respect, and according to another aspect, the invention can be embodied as a method for managing a key-value store as described above. In embodiments, this method comprises: receiving, from a user of the key-value store, a query to get a file of said user, said query comprising metadata matching a KVP of the second type stored on the key-value store; and providing, in response to the query received, one or more KVPs of the first type that are linked by the matched KVP of the second type. In preferred embodiments, the method further comprises steps to put user files to the key-value store. Other operations are possible.

According to a final aspect, the invention is embodied as a computer program product for managing computer hardware and software resources of a key-value store such as discussed above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying drawings show simplified representations of computerized systems and systems, or parts thereof, as involved in embodiments. Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section addresses more specific embodiments and technical implementation details (sect. 2).

Figure 1:
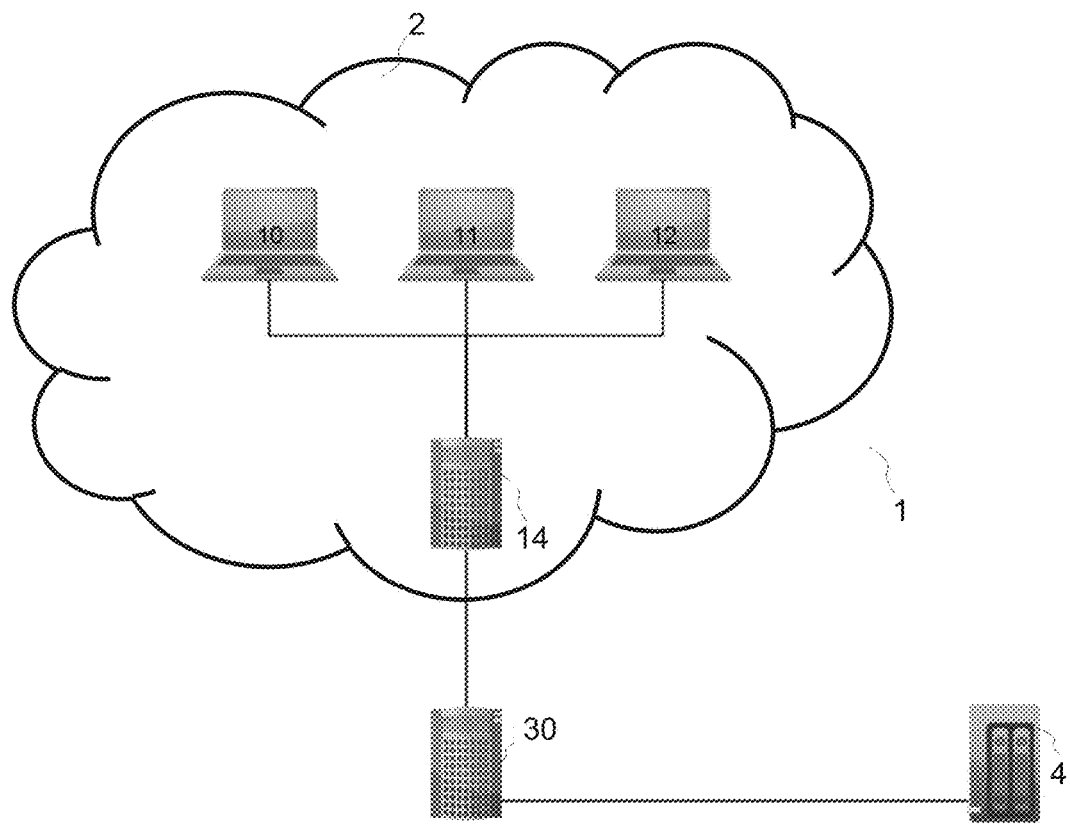
FIG. 1 schematically represents a key-value store implemented in a cloud, according to embodiments of the invention.
Figure 2:
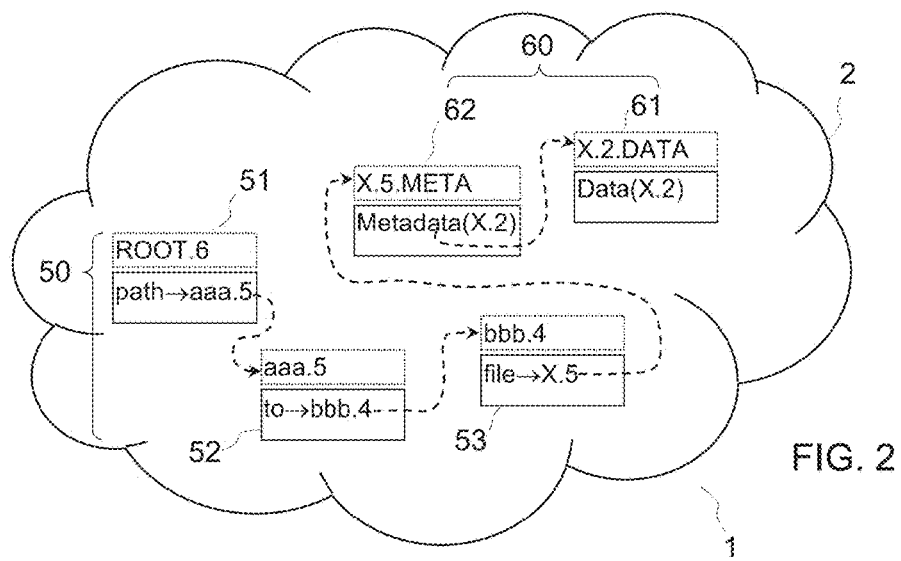
FIG. 2 schematically illustrates how key-value pairs, including a pair of key-value pairs that corresponds to a user file, are linked in a key-value store as in FIG. 1, according to embodiments.
Figure 3:
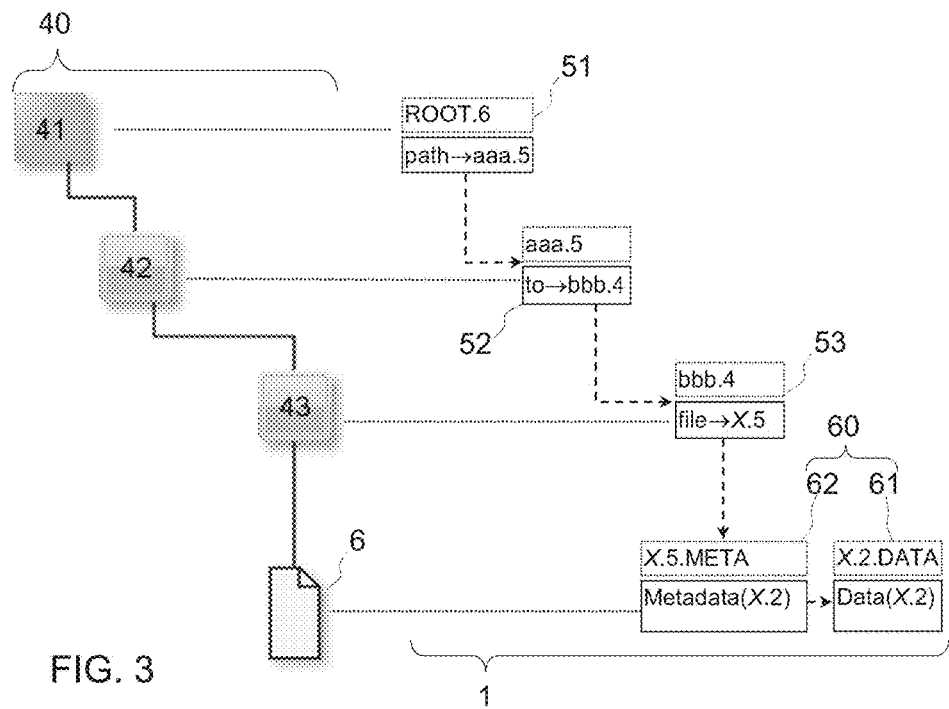
FIG. 3 is a diagram schematically illustrating how files and directories of a user filesystem are captured by key-value pairs of a key-value store as in FIG. 1, as involved in embodiments.

In reference to FIGS. 1-3, an aspect of the invention is first described, which concerns a key-value store 1, hereafter denoted by "KVS". The KVS 1 is generally designed for storing and retrieving user files 6 based on key-value pairs, or KVPs. It may, more generally, be designed for managing files stored thereon, as known per se. Many users are likely to use said KVS, which typically is operated in a cloud 2 (e.g., a public or private cloud).

According the present approach, for each user 4 of the KVS 1: each file 6 of a set of user files is stored as one or more pairs 60 of KVPs. I.e., at least one pair of KVPs is required to store (and locate) a file. Yet, a single file may require several KVP pairs to capture contents of said file. Each KVP pair 60 comprises a KVP 61 of a first type (hereafter KVP1) and a KVP 62 of a second type (KVP2). The KVP1 comprises contents of a file 6 (or a part thereof), whereas the KVP2 comprises metadata of said file 6, as well as attributes, if necessary. Thus, a KVP1 relates to data (or contents); it is also referred to as a .DATA object in FIGS. 2 and 3, as well as in the specific embodiments discussed in sect. 2. KVP2s objects (metadata) are also referred to as a .META objects in FIGS. 2 and 3, as well as in sect. 2.

Remarkably, each KVP2 62 links to one or more KVP1s 61. Thus, according to the present approach, files are stored as KVPs, where one pair 62 (which relates to metadata) links to one or more pairs of KVP directed to the file contents. Having files stored as pairs of KVPs is a basic component of present KVS systems, and is a pre-requisite for emulating users' filesystems on the KVS, according to the present approach. As we shall see, such pairs of KVPs allow for better flexibility in the file management and makes it furthermore possible to save memory space on the KVS. For instance, a user may upload (i.e., put) a file on the KVS, such that this file may subsequently be safely removed from his/her local filesystem. Later on, that user may nevertheless recover (i.e., get) his/her file from the KVS thanks to instructions based on file metadata. Metadata are maintained on the filesystem, it being noted that a metadata object is typically much smaller than the contents object.

Beyond metadata, KVP2s 62 may further comprise attributes, e.g., extended attributes of the files. Metadata (and attributes) contain information about the file and its context (starting with its location in the user's filesystem), which the KVS may use to update links to KVPs.

More in detail, file systems have certain data being stored on file system directories, which data are related to, e.g., the type, the size, the time creation, etc., of a file. For instance, GPFS file systems (and others) offers the possibility to extend attributes stored within a file's metadata so as to include some application-specific values. The cumulated size of such attributes is typically limited by the file systems. In the present case, the KVS may use metadata as notably captured in attributes (or extended attributes) to update links to KVPs.

The local user system may locally maintain the metadata objects (KVP2s) as such, or not, as long as the necessary information is kept that makes it possible to later retrieve the corresponding contents from the KVS. Most simple, however, if for the user filesystem to keep metadata object as such, to ease subsequent get/put requests.

A "user", as referred to herein, may be an application or a service running on a computerized device or a computer system (e.g., a device or system of a private user or a company, or a network of interconnected machines, a cloud, another KVS, etc.).

Additional types of KVPs may be involved, in order to enable a representation of users' filesystems. For instance, in embodiments, the KVS 1 further comprises, for each user 4, KVPs of a third type (or KVP3s, denoted by references 52, 53 in FIGS. 2, 3). KVP3s aim at emulating respective directories (or folders) 42, 43 of a filesystem 40 of a user 4, as illustrated in FIG. 3. As further depicted in FIG. 2 or 3, a KVP3 53 may link to one or more KVP2s 62, which itself links to one or more KVP1s 61, so as to reflect relations between a directory and a file 6 stored thereunder on the user's filesystem.

As illustrated in FIG. 3, directories 42, 43 (on the user's filesystem) typically comprise, or have comprised at some point in time, one or more files 6 that have been put on the KVS 1, such that contents of such files 6 as stored as KVP1s 61 on the KVS are linked by KVP2s 62. However, files that have been put on the KVS may have subsequently been removed from the user filesystem 40, or relocated. Thus, the hierarchical relationships on the KVS's do not necessarily perfectly reflect the hierarchical relationships of the filesystem 40 (at least not synchronously). On the contrary, a user 4 may want to delete files after having put them on the KVS.

A KVP3 52 may further link to one or more (descendant) KVP3s 53, to reflect one or more child directories 43 in the user filesystem 40. To that aim, each KVP3 typically comprises (as a value), a table of entries mapping file and directory names to key strings corresponding to (descendant) KVPs. Metadata (and attributes) of files contain information about the file and its location in the user's filesystem 40, which the KVS 1 can use to update links to KVPs. Again, this makes it possible to reflect a user's filesystem 40 or part thereof 42, 43, at least at some point in time. If the filesystem 40 is not changed on the user's side, the KVS will eventually reflect the filesystem's structure, thanks to metadata passed upon get/put operations. However, since the user may reconfigure the filesystem between two get/put operations, discrepancies can be expected. Local changes to the filesystem structure are nevertheless mirrored at the KVS at some point, e.g., upon putting files to or getting files from the KVS, thanks to metadata and/or extended parameters of such files, as exemplified later.

Note, however, that specific embodiments are described (see in particular sect. 2), which make it possible to maintain the filesystem structure at all times on the KVS, provided that files' metadata are suitably kept on the filesystem. In such cases, there is a KVP3 52, 53 (on the KVS) that corresponds to each directory 42, 43 on the filesystem 40 (and this, for each user 4).

In embodiments, the KVS 1 is further configured to logically constrain the naming of KVPs of each type. This makes it possible to ensure that any new KVP put or created in the KVS has a unique name (i.e., a unique key), so as to not overwrite an existing KVP stored on the KVP. In addition, a new KVP is preferably stored on the KVS so as to shadow an older version of said new KVP, as discussed in further detail in sect. 2.

The KVS may for instance logically constrain the naming of KVPs such that the name of a KVP includes a string that is changed every time such a KVP is stored anew on the KVS, with a changed value (typically in case of updates to the file contents or its metadata). Said string is typically changed to a unique new string (or at least a string that has a small probability of colliding with another such string) every time the KVP is put to or created in the KVS, with a value that is changed with respect to an older version of that KVS. Having a unique name for each version of each file of each filesystem counterparted in the KVS makes it easier to manage versions of KVP objects stored thereon, as discussed later in detail.

Consider for instance KVPs of the first type (contents, or .DATA) and the second type (metadata, or .META): as illustrated in FIGS. 2 and 3, the names of such KVP 61, 62 include, each, a string (X.2 and X.5, respectively) that notably includes a substring X, where X uniquely identifies file 6 in the filesystem 40 of user 4. Of course, complex substrings shall be used in practice, to avoid collisions. I.e., this substring is unique or, at least, has a small probability of colliding with another substring.

For example, the substring X may notably include a string that identifies the filesystem 40 of user 4. The substring X may further include another substring that identifies a file 6 to which the KVP pertains. The substring X may accordingly concatenate various strings, so as to make up a unique string, or at least a string that has a small probability of colliding with another similar string, to identify a file. This is discussed in detail in sect. 2.

In embodiments, file names may further includes a counter that is increased every time that KVPs are stored on the KVS with a changed value. For example, in FIGS. 2 and 3, the names of KVPs 61 and 62 (X.2 and X.5, respectively) include counters respectively set to 2 and 5. A counter is typically initialized to zero at the first migration of the file and increased every time the file is migrated again or its metadata are changed.

Similarly, the naming of KVPs of the third type (directories) can be constrained such that a name of a KVP3 comprises, e.g., a hash of a value, or part of the value, of said KVP3. In addition, the names of KVP3s may include a counter, having a similar function as counters included in the names of KVP1s and KVP2s. For instance, in the examples of FIGS. 2 and 3, KVP3s 52, 53 include counters set to 5 and 4, respectively.

The KVS 1 may further include (for each user) a KVP 51 of a fourth type (call it KVP4), linking to one or more KVP3s, so as to reflect a root directory 41 of the filesystem 40 of each user 4.

As there is typically only one KVP4 per user, this node may include a static string, e.g., "ROOT" in the examples of FIGS. 2 and 3. However, said KVP4 will advantageously include a global counter, which is incremented every time a value of any of its descendant KVP3s 52, 53 is altered, in order to suitably update the link chain and shadow older versions of the KVPs.

In the examples of FIGS. 2 and 3, the file 6 of the filesystem 40 is assumed to be located, in the filesystem 40, under "/path/to/". I.e., the file "file" can be reached at "/path/to/file". The root node 41 has a counterpart object 51 in the KVS 1, named "ROOT.6", as evoked earlier. The value of object 51 contains an entry "path→aaa.5", which links a directory name "path" to the key string "aaa.5", corresponding to KVP3 52. The KVP3 52 is thus linked to KVP4 51, in a comparable manner as the directory 42 is to the root 41. Similarly, the value of KVP3 52 contains an entry "to→bbb.4", which provides a link to KVP3 53, named "bbb.4", so as to reflect the context of directory 43. In other words, the values of the KVP3s contain, each, a table that links file (and directory) names on the filesystem to key strings in the KVS. For instance, the value of KVP3 53 is "file→X.5", which provides a link to KVP2 62 ("X.5.META"). The value of KVP2 62 comprises metadata (and possibly attributes) of the file 6 ("file"). Such metadata are figuratively denoted by "Metadata(X.2)" in FIGS. 2 and 3. Amongst other attributes, the metadata "Metadata(X.2)" notably include the name of KVP1 61 ("X.2.DATA"), properly encoded, so that KVP2 62 points at KVP1 61 ("X.2.DATA"), whose value comprises contents of file 6.

Thanks to the above feature, the KVS 1 can be configured such that, if any descendant KVP (for example the object 62) is altered, each KVP3 on the path from the KVP4 to the altered KVP is suitably renamed. Indeed, changing the value of a descendant KVP causes to change its name. Links to that name are then suitably updated in the ancestor's tables. Renamed KVP3s can furthermore be stored on the KVS so as to shadow an older version thereof; this can be simply managed, notably thanks to counters included in the object names. The renamed KVPs shall thus successively link to the altered KVP.

As evoked earlier, a KVS according to present embodiments is typically operated in a cloud 2. As illustrated in FIG. 1, the cloud 2 typically comprises multiple nodes 10-12, as well as additional systems 14, 30, e.g., a synchronization and/or storage systems 14, a gateway 30, etc. The user may for instance access to the KVS 1 via the gateway 30. Many possible configurations can be contemplated for the KVS 1 and the cloud 2 in which it operates, as known per se.

The cloud 2 is a set of computer resources organized in such a way that the owner of the resources may dynamically allocate part or all of those resources to users such as the present KVS. The cloud 2 may be a private cloud (the KVS 1 and the owner of the cloud 2 belong to the same organization; the cloud infrastructure may be operated solely for the KVS) or an external cloud (e.g., a public cloud or another private cloud, having typically more resources).

Figure 4:
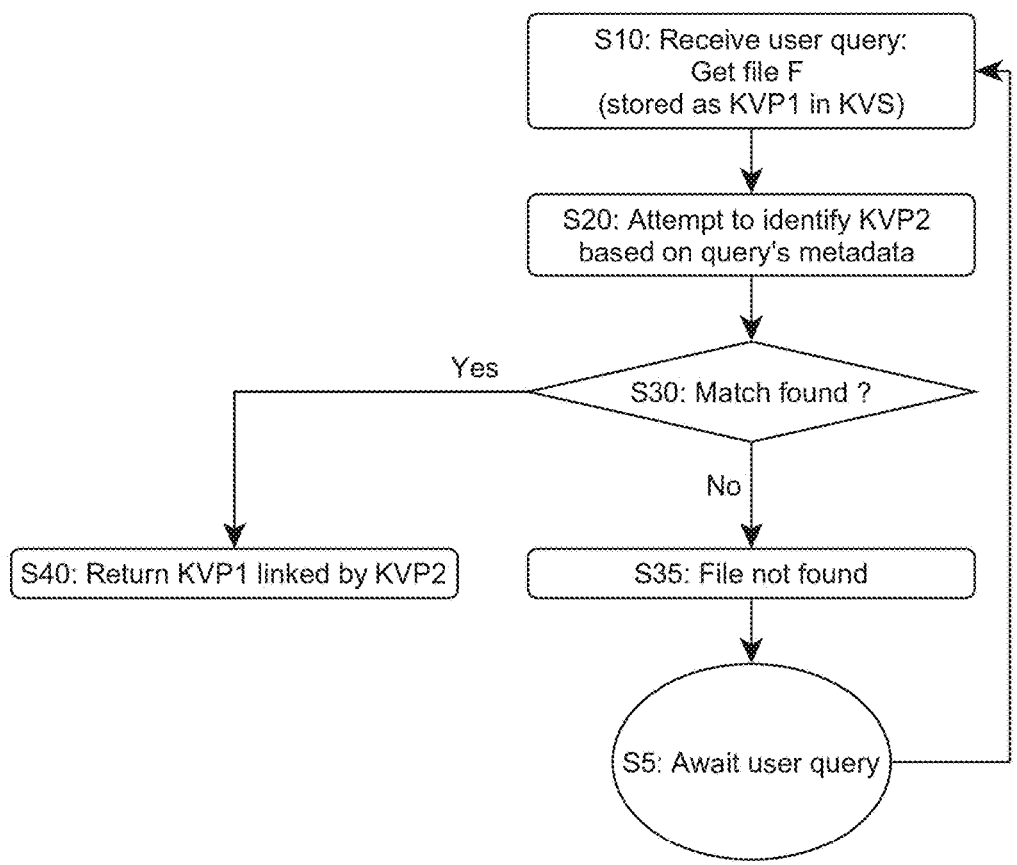
FIG. 4 is a flowchart illustrating high-level steps of a method for retrieving a file from a key-value store as in FIG. 1, according to embodiments.
Figure 5:
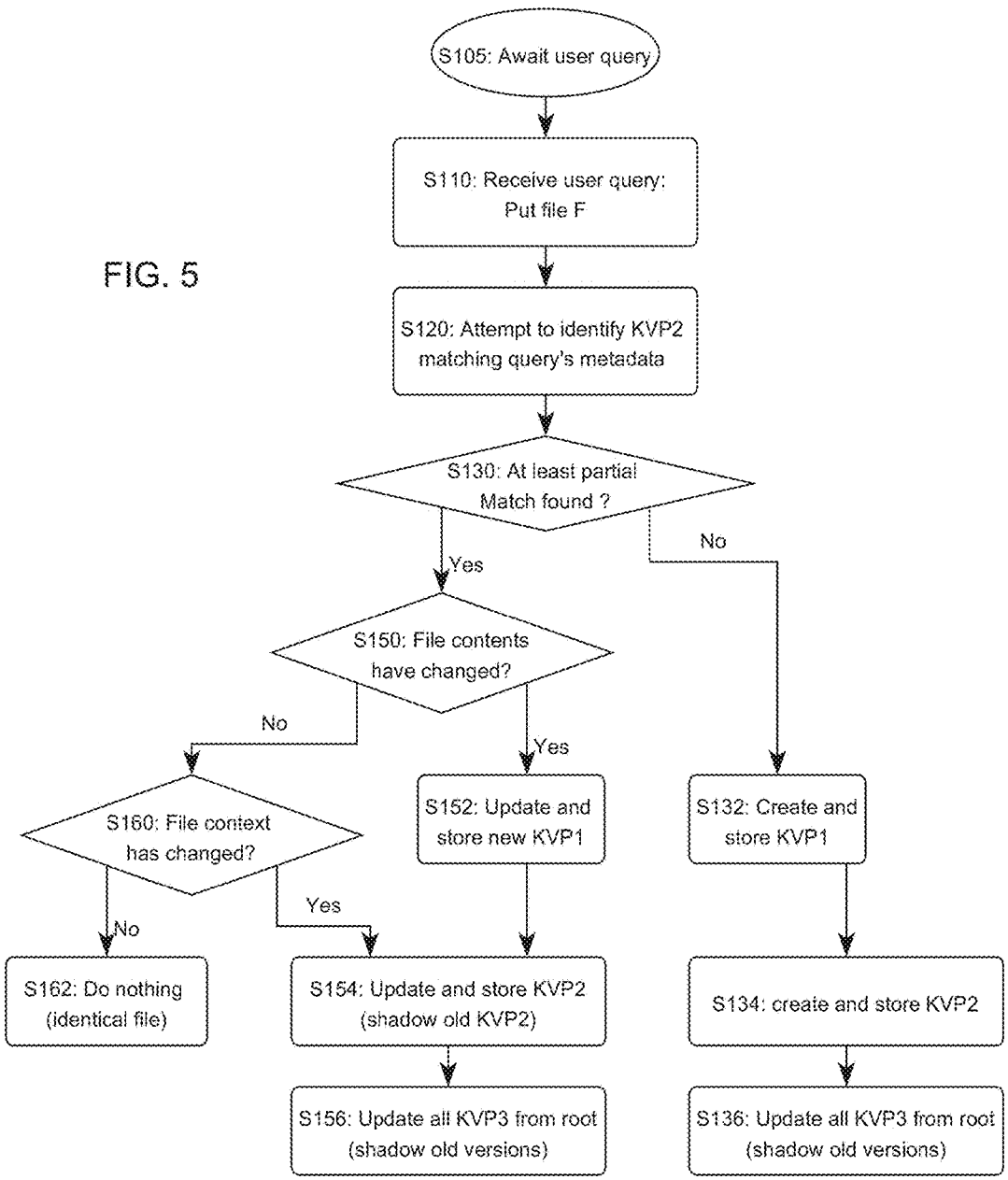
FIG. 5 is a flowchart illustrating high-level steps of a method for putting a file to a key-value store as in FIG. 1, as involved in embodiments.

Referring now to FIGS. 4 and 5: according to another aspect, the invention can be embodied as a computerized methods for managing a KVS 1 such as described above. Most basically, such methods revolve around get/put operations, whereby files are retrieved from the KVS 1 or put (e.g., migrated) thereon.

FIG. 4 depicts a typical get operation. The KVS 1, which typically configured to manage objects stored thereon, may comprise a query manager, which monitors S5 user queries. The query manager may receive S10, from any user, a query to get a file. Said query is accompanied by metadata characterizing the desired file (and its context, e.g., its location in the filesystem when it was last migrated). Upon reception S10, the query manager attempts S20-S30 to identify a KVP2 (a metadata object) matching S20-S30 said metadata. The query manager uses the metadata accompanying the query to track a latest version of a KVP2 object that matches such metadata (e.g., thanks to counters included in the object names). If a match is found S30, the query manager may locate one or more KVP1s (linked by the matching KVP2) and return S40 the located KVP1s to the user. If no match is found, the query manager informs S35 the user accordingly.

FIG. 5 depicts a typical put operation. The query manager monitors S105 user queries: it may receive S110, from a user, a query to put a file of said user to the KVS. Again, said query comprises metadata that characterize the file, e.g., its location in the user's filesystem, etc.

Upon reception S110, the query manager will attempts to identify S120-S130 a KVP2 that at least partly matches said metadata, the point being to detect whether a previous version of that file is already stored, based on the sole metadata provided.

If not even a partial match is found, S130, one or more KVP1s are created (which capture the contents of the file to be put) and stored on the KVS, S132. One or more corresponding KVP2s are created (which links to respective KVP1s) and stored on the KVS, S134. Finally, all KVP3s on the path from the root KVP4 are updated as necessary and stored on the KVS so as to shadow old versions thereof, S136.

If a partial match is found at step S130 (indicating that a previous version of the file was already stored on the KVS), additional comparisons S150, S160 are needed to determine whether: (i) the file contents have changed S150 since the last put; and (ii) the file context has changed S160 (e.g., the file may now be located in another directory of the filesystem). In practice, steps S130, S150, and S160 are typically aggregated as a single comparison operation, performed ex-ante.

If the file contents have changed, one or more KVP1s are accordingly updated and stored on the KVS, S152. One or more corresponding KVP2s are updated (which links to respective, updated KVP1s), taking into account possible changes as to the file context (S160/Yes), and stored on the KVS, S154. Finally, all KVP3s on the path from the root KVP4 are updated as necessary and stored on the KVS (so as to shadow old versions thereof, S156).

If none of the file contents and the context has changed (S160/No), no action is taken as there is no need to delete and replace previous versions of the KVP1s and KVP2s in that case (memory space is thus saved, compared to known solutions).

Finally, and according to another aspect, the invention can be embodied as a computer program product for managing computer hardware and software resources of a KVS 1 such as described above. This computer program product comprises a computer readable storage medium having program instructions embodied therewith; The program instructions are executable by a computerized system of the KVS to cause the latter to store user files pairs of KVPs, following the same principles as described above in reference to the KVS. This aspect of the invention is described in more detail in sect. 2, in reference to FIG. 6.

The above embodiments have been succinctly described in reference to the accompanying drawings and may accommodate a number of variants. Several combinations of the above features may be contemplated. Examples are given in the next section.

Specific embodiments discussed in this section present a solution for the representation of filesystem data and metadata over a generic KVS interface. This problem is of relevance given that most critical data are still stored by filesystems and KVSs are becoming prominent for cloud workloads. The problem is not straightforward given that, e.g., the POSIX filesystem interface is substantially richer than that exposed by KVSs. Also, the consistency model offered by typical KVSs is to be assumed weak: most KVSs are only capable of offering the so-called "eventual consistency" model, whereas POSIX filesystems offer atomicity in a number of operations. Another problem solved by embodiments discussed herein is that they allow immutable storage to be mapped to filesystems that allow for partial updates.

The following embodiments focus mostly on a use-case where the KVS interface is used for tiering purposes, without prejudice. I.e., a system for live data or for backup/archival can easily be derived from the following.

In these embodiments, and as discussed in the previous section, files originating from a user filesystem are stored as a pair of KVPs, one (KVP2) containing the file's metadata and extended attributes (also referred to as a ".META object") and one (KVP1) containing (parts of) the file's data (also referred to as a ".DATA object"). A .META object (KVP2) links to one or more .DATA objects (KVP1), following principles discussed earlier. Maintaining file names and the directory structure requires a different set of KVPs (KVP3s, also referred to as "cloud directory nodes"). KVP3s contain a table that links file (and directory) names on the filesystem to key strings in the KVS.

As discussed below in detail, the naming of KVPs (for .META and .DATA objects and for cloud directory nodes) ensures that objects are never overwritten: a new pair is always created to "shadow" an old pair (if there ever was one; an operation may create a new version of an old pair), and the old pair can then be removed. This ensures that outdated values can be presented for a given key due to eventual consistency.

The embodiments below essentially rely on three types of KVPs, i.e., .DATA objects (KVP1s), .META objects (KVP2) and cloud directory nodes (KVP3s). In addition, a root node is used.

The name of a KVP is the key, while its content, or payload, is the value. The naming for .META and .DATA objects for a given file preferably obey the following rules.

First, a basename B is generated, which is preferably formed as follows: B=fsid.fid, where fsid is a string that uniquely identifies the filesystem and fid is a string that uniquely identifies that file inside the filesystem. For example, fid may be formed as a concatenation of an inode number for the file and another number, gnum, where gnum is a string that uniquely identifies the version of the inode. This way, and because inode numbers can be reallocated from an old deleted file to a new one by the filesystem, gnum (and then fid) ensures that there is no possible confusion.

The name of a .META object (KVP1) is concatenated as B.mgen.META, where mgen is a counter initialized to zero at the first migration and increased every time the file is migrated and its metadata have changed.

Analogously, the name of the .DATA object is B.dgen.DATA, where dgen plays the same role as mgen but for the file's data.

All cloud directory nodes (but the root), i.e., KVP3s, follow the same naming convention: the name is represented by the hash of the contents of the table it contains. The root node (KVP4) is instead named ROOT.dirgen where dirgen is a global counter that is incremented any time a new entry is added to any cloud directory node.

The layout for cloud directory nodes may vary from a single node for the entire filesystem to multiple nodes required to represent a single directory. Without loss of generality, we focus here on a scenario where a single cloud directory node is used for a single directory node in the filesystem. The hierarchy of cloud directory nodes starts with a root cloud directory node, containing all entries for files and directories directly contained by the root directory of the filesystem. For any given directory on the filesystem there exists a cloud directory node on the KVS.

A cloud directory node contains a table with entries as follows:
  A file entry, mapping the name of a file originating from a given directory on the filesystem to the name of a .META object (KVP2) in the KVS; and
  A directory entry, mapping the name of a child directory in that directory on the filesystem to the name of a cloud directory node.

Adding a new entry to a directory node implies that all the directory nodes on the path from the root to the affected directory node are updated and shadow an older version of that node. In particular:
  The impacted node is updated by generating a new cloud directory node, whose value is equal to that of the old node plus the new entry. The new node is stored on the KVS so as to shadow the old node;
  Other nodes in the path (starting from the parent of the affected node upward to the root) are updated by replacing the old link by a new link to the changed child node; and
  A new root cloud directory object (KVP4) is put, which completes the update.

The supported, high-level operations are typically the following:
  Migrate: file's data and metadata are copied to the KVS and the file's data are removed from the filesystem while the file's metadata are kept;

Recall: file's data are copied from the KVS back to the filesystem; and

Restore: a new file is created out of the copies of data and metadata stored in the KVS (created by a previous migrate operation).

In addition, other operations are possible.

A migration operation may do nothing or may create a copy of the file's data, metadata (or both) on the KVS, as illustrated in FIG. 5. The operation does nothing if it is invoked when the file has been previously successfully migrated and has not been changed since. If only the file's metadata have changed since the previous migration, mgen is incremented, a new .META object is created based on the file's metadata, which object includes a link to the old version of the file's .DATA object. The new .META object is created on the KVS and a new link is created in the relevant cloud directory, linking the file's name to the new .META object.

If both data and metadata of the file have changed since the previous migration, both mgen and dgen are incremented. A new .DATA object and a new .META object, linking to the new .DATA object, are put to the KVS. Finally, a new link is created in the relevant cloud directory, linking the file's name to the new .META object.

A recall operation is executed only when the file's data have been removed from the filesystem. In this case, the .DATA object created by the most recent migration operation is fetched from the KVS and the (currently empty) data content is replaced by the content of the .DATA object.

A restore operation takes place when a new file need be populated with the data and metadata of a file which has previously been migrated. At first, the cloud directory nodes are consulted to identify the name of the .META object corresponding to the file and version to be restored. Then, a new file is created, with the metadata contained in the .META object and the data contained by the .DATA object(s) linked by it.

Recall and restore operations use a "get" mechanism, such as depicted in FIG. 4.

So far, we have described a mapping between .META objects and .DATA objects where one single .DATA object can be referenced by a .META object. The simplest approach is indeed for a .META object to point at one .DATA object which contain the entire contents of a file.

However, the mapping may be more sophisticated, in that instead of a single pointer, one may have multiple pointers that point to multiple objects. In that case, the file's contents can be rebuild by downloading (and then concatenating) contents of said multiple objects.

Still, this scheme may be more sophisticated inasmuch as the file's content may be rebuild by downloading contents of multiple objects (suitably pointed at by the .META object, via intermediate .META objects) and then only partly concatenating such contents, e.g., by concatenating the first byte of object 1, then bytes 3, 5 and 9 of object 2 and then bytes 1 through 256 of object 3. In other words, a .DATA object may contain unallocated parts, which allows more flexibility in the object management.

To that aim, the value of a .DATA object may comprise a table with three fields:

src byte range: this field identifies a range of byte of the file represented by the .META object at hand; the range is represented by a pair of integers representing a beginning and a length;

.DATA object name: this field identifies another .DATA object; and dst offset: this field represents an offset inside this other .DATA object specified by the previous field.

The role of each of these fields can be explained with an example. Consider a file, whose initial .META object contains (as a value) the following table:

0, 100; abc.DATA; 0
100, 100; def.DATA; 10

For the first entry, the parameter src byte range is 0, 100, meaning that the file's contents are notably constituted by the first hundred bytes of the object "abc.DATA", as identified by the parameter .DATA object name of the first entry. No offset is to be considered here as dst offset=0. Due to the second entry, one understands that the first hundred bytes of the object "abc.DATA" must be followed by the 10th to 110th bytes of the "def.DATA" object.

Deduplication can be achieved by having the .META object of multiple different files point to the content of the same .DATA object.

Sparse files can be accommodated by leaving some of the bytes of the src byte range field point to a special ZERO.DATA object, which is just a marker that is to be interpreted as an object of infinite size, whose every byte is equal to zero. The object does not exist in practice, so that sparse files are actually not consuming any space.

Assuming a migrated file has the following table in its .META object:

0,100; abc.DATA; 0
100,100; def.DATA; 10

If a single byte at position 30 is changed and the file is migrated again, the migration code can be changed to only migrate the single byte that has changed (assume that the object created is called xyz.DATA). Then the table of the new .META object can be organized to include:

0,29; abc.DATA; 0
29,1; xyz.DATA; 0
30,70; abc.DATA; 30
100,100; def.DATA; 10

This ensures that only a minimum amount of data has to be exchanged to support partial updates.

Embodiments disclosed herein provide methods and systems are constructed to support tiering and backups in a filesystem. In particular:

The naming of the objects, to which files are mapped, is constructed in such a way that overwriting is not possible. For instance, the names of the objects can be chosen using values that are unique for the filesystem. In addition, two different version numbers are provided per file: one for the metadata objects and one for data objects. These counter values are suitably handled by the filesystem to avoid overwriting different versions of files' data and metadata in the KVS;

The way that files/directories on the filesystem are mapped to objects in the KVS allows for economic transfer of data to the cloud. In particular, when a new backup of a directory is requested, the present cloud directory structure and links from .META to corresponding .DATA objects makes sure that only those files that were actually modified will be stored on the KVS (which saves memory space on the KVS). Thus, files for which only the metadata were changed since a last tiering/backup only lead to upload a .META object to the cloud, which saves bandwidth, in addition to memory space. This is especially important for distributed filesystems, where backups and tiering operations can be quite frequent.

The present naming structures enable tiering operations that are supported despite a likely eventual consistency property of the distributed KVS, at the price of little additional information to be maintained by the filesystem (e.g., in the file inode), i.e., the version counters of each file, and a global counter for the entire filesystem.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

Figure 6:
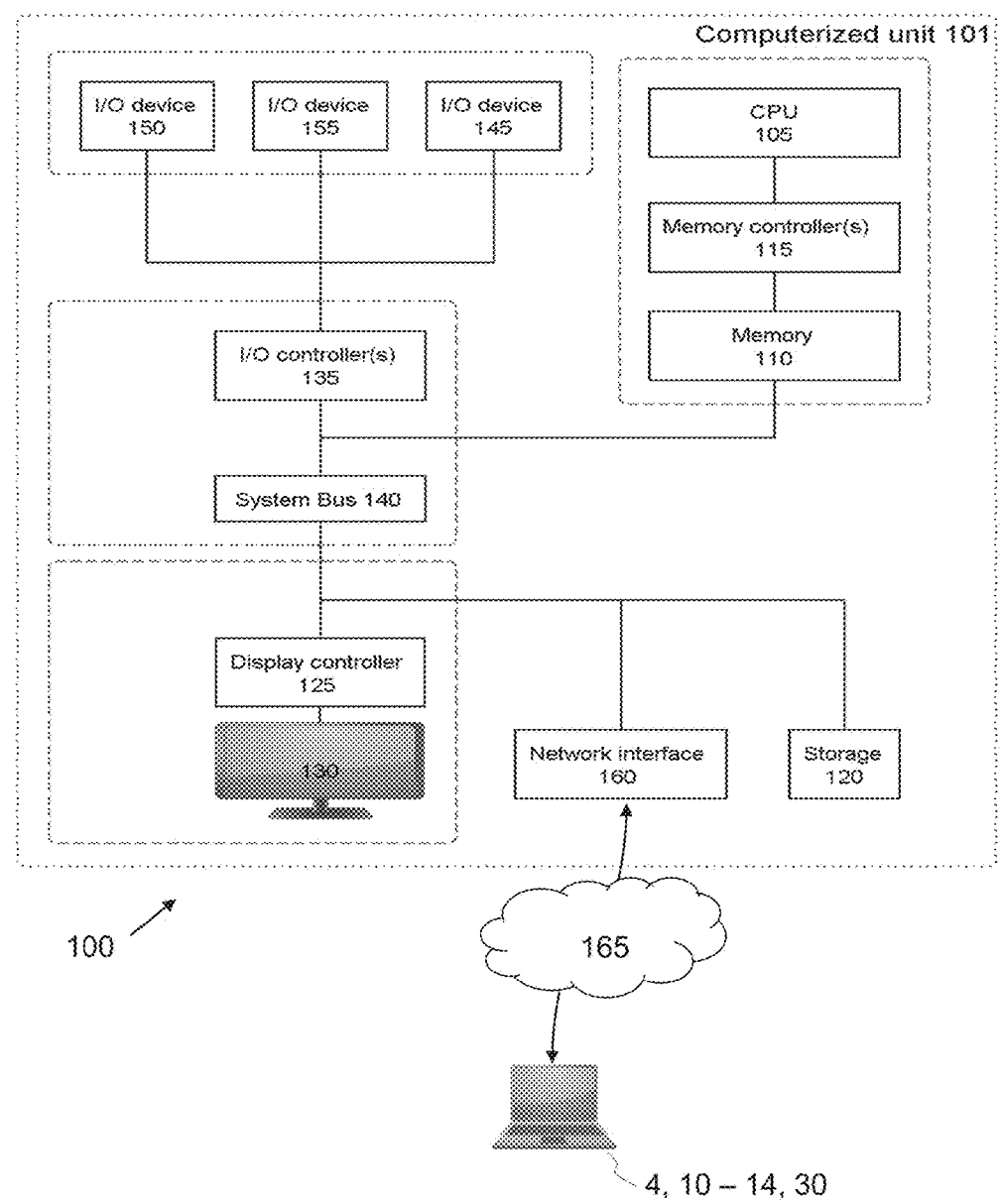
FIG. 6 schematically represents a general purpose computerized system, such as involved in, e.g., a key-value store or an external system interacting therewith, and suited for implementing one or more method steps as in embodiments of the invention.

For instance, the system 100 depicted in FIG. 6 schematically represents a computerized unit 101, e.g., a general-purpose computer, which may be used in place or as part of any or each of the units 4, 10, 11, 12, 14 or 30 depicted in FIG. 2. As such, the unit 101 may interact with any one of the other the units 4, 10-14 or 30, via a telecommunication network 165.

In exemplary embodiments, in terms of hardware architecture, as shown in FIG. 6, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 6, the software in the memory 110 includes methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165, to enable, in turn, data communication to/from components 4, 10, 11, 12, 30. More generally, the network 165 may provide communication infrastructure for part or all communications within/to/from the cloud 2.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system (a KVS), a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A key-value storage system for storing and retrieving user files based on key-value pairs, or KVPs, the system comprising:
   a hardware processor of the key-value storage system, configuring the storage system to: for each user of the key-value store, store each file of a set of files of said each user as one or more pairs of KVPs in a memory, wherein,
   each of said one or more pairs comprises:
      a KVP of a first type, which comprises at least a part of contents of said each file; and
      a KVP of a second type, which comprises metadata of said each file, and for each user, the key-value storage system further comprises:
         at least one KVPs of a third type, emulating at least one directory, respectively, of a filesystem of said each user, wherein said at least one KVPs of a third type links to one or more KVPs of the second type, the one or more KVPs of the second type linking to one or more KVPs of the first type,
wherein, said hardware processor further configures the storage system to:
   further link said at least one KVP of the third type to one or more additional KVPs of the third type, to respectively emulate one or more child directories of said at least one directory of the user filesystem,
   logically constrain a naming of KVPs of each of the first type and the second type in the key-value store so that a name of any of such KVPs includes a string that is changed every time said any of such KVPs is stored on the key-value storage system with a changed value, said string including, as a substring, a counter; and
   increase the counter of a string every time that said any of such KVPs is stored on the key-value storage system with a changed value.

2. The key-value storage system according to claim 1, wherein said hardware processor further configures the storage system to:
   logically constrain a naming of KVPs of each of the first type, the second type and the third type, to ensure that any new KVP put or created in the key-value store has a unique name, this name corresponding to a key of said any new KVP.

3. The key-value storage system according to claim 2, wherein
   said string includes a substring that identifies the filesystem of said each user.

4. The key-value storage system according to claim 3, wherein
   said string further includes another substring that identifies a file to which said any of such KVPs pertains.

5. The key-value storage system according to claim 2, wherein said hardware processor further configures the storage system to:
   logically constrain the naming of KVPs of the third type, such that a name of each of said KVPs of the third type comprises a hash of a value, or part of the value, of said each of said KVPs of the third type.

6. The key-value storage system according to claim 1, wherein said hardware processor further configures the storage system
   such that any new KVP of any of the first type, the second type or the third type, that is put or created therein, is stored on the key-value storage system so as to shadow an older version of said new KVP.

7. The key-value storage system according to claim 1, wherein,
   for each user, the key-value storage system further comprises a KVP of a fourth type, linking to one or more KVPs of the third type, so as to emulate a root directory of the filesystem of said each user.

8. The key-value storage system according to claim 7, wherein said hardware processor further configures the storage system to:
   constrain a name of said KVP of the fourth type to include a global counter that is incremented every time a value of any of descendant KVPs of said KVP of the fourth type is altered.

9. The key-value storage system according to claim 7, wherein said hardware processor further configures the storage system
   such that, if any of said descendant KVPs is altered, each of the KVPs of the third type on a path between said KVP of the fourth type and the altered KVP is renamed and stored on the key-value storage system so as to shadow an older version thereof.

10. The key-value storage system according to claim 1, wherein
    said key-value store is a cloud-based key-value storage system, said hardware processor further configures the storage system for storing user files in a cloud and retrieving said user files from said cloud.

11. A method for managing a key-value storage system according to claim 1, comprising:
    receiving, at the hardware processor, from a user of the key-value storage system, a query to get a file of said user, said query comprising metadata matching a KVP of the second type stored on the key-value storage system; and
    providing, by the hardware processor, in response to the query received, one or more KVPs of the first type that are linked by the matched KVP of the second type.

12. The method according to claim 11, further comprising:
    receiving, at the hardware processor, from a user of the key-value storage system, a query to put a file of said user to the key-value storage system, said query comprising metadata;
    identifying using the hardware processor, a KVP of the second type, which at least partly matches said metadata; and
    determining, using the hardware processor, from the identified KVP of the second type, whether contents and/or a context of the file to be put have changed with respect to a previous version put on the KVS.

13. The method according to claim 12, wherein the method further comprises,
    if, according to an outcome of the step of determining, only the context of the file to be put has changed while its contents have not,
        creating, using the hardware processor, one or more new KVPs of the second type in accordance with the changed context, which links to one or more KVPs of the first type that correspond to unchanged contents of the file be put, and storing the new KVP created on the key-value storage system.

14. The method according to claim 12, wherein the method further comprises:

if, according to an outcome of the step of determining, only the contents of the file to be put have changed, while the context of the file has not,
updating, using the hardware processor, one or more KVPs of the first type in accordance with the changed contents of the file be put, and storing the updated one or more KVPs of the first type on the KVS, and
updating, using the hardware processor, one or more KVPs of the second type in accordance with the changed contents, which link to the updated one or more KVPs of the first type, and storing the updated one or more KVPs of the second type on the KVS.

15. The method according to claim 12, wherein the method further comprises:

if, according to an outcome of the step of determining, both the contents and the context of the file to be put have changed,
updating, using the hardware processor, one or more KVPs of the first type in accordance with the changed contents of the file be put, and storing the updated one or more KVPs of the first type on the KVS, and
updating, using the hardware processor, one or more KVPs of the second type in accordance with both the changed contents and context, which link to the updated one or more KVPs of the first type, and storing the updated one or more KVPs of the second type on the KVS.

16. A computer program product for managing computer hardware and software resources of a key-value storage system designed for storing and retrieving user files based on key-value pairs, or KVPs, the computer program product comprising a computer readable storage medium having program instructions embodied therewith, the program instructions being executable by a hardware processor of a computerized system of the key-value storage system to cause the latter to:

store, for each user of the key-value storage system, each file of a set of files of said each user as one or more pairs of KVPs, wherein,
each of said one or more pairs comprises:
a KVP of a first type, which comprises at least a part of contents of said each file; and
a KVP of a second type, which comprises metadata of said each file, and for each user, the key-value storage system further comprises:
at least one KVPs of a third type, emulating at least one directory, respectively, of a filesystem of said each user, wherein said at least one KVPs of a third type links to one or more KVPs of the second type, the one or more KVPs of the second type linking to one or more KVPs of the first type,
wherein, said program instructions configure the hardware processor of said computerized system to:
further link said at least one KVP of the third type to one or more additional KVPs of the third type, to respectively emulate one or more child directories of said at least one directory of the user filesystem,
logically constrain a naming of KVPs of each of the first type and the second type in the key-value store so that a name of any of such KVPs includes a string that is changed every time said any of such KVPs is stored on the key-value storage system with a changed value, said string including, as a substring, a counter; and
increase the counter of a string every time that said any of such KVPs is stored on the key-value storage system with a changed value.

* * * * *